US012772216B2

(12) United States Patent
Cui et al.

(10) Patent No.: US 12,772,216 B2
(45) Date of Patent: Oct. 20, 2026

(54) METHOD FOR CHANNEL ESTIMATION, TERMINAL DEVICE, AND NETWORK DEVICE

(71) Applicant: GUANGDONG OPPO MOBILE TELECOMMUNICATIONS CORP., LTD., Guangdong (CN)

(72) Inventors: Shengjiang Cui, Guangdong (CN); Chuanfeng He, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 284 days.

(21) Appl. No.: 18/355,062

(22) Filed: Jul. 19, 2023

(65) Prior Publication Data

US 2024/0023076 A1 Jan. 18, 2024

Related U.S. Application Data

(63) Continuation of application No. PCT/CN2021/086712, filed on Apr. 12, 2021.

(51) Int. Cl.

| | |
|---|---|
| ***H04W 4/00*** | (2018.01) |
| ***H04L 1/18*** | (2023.01) |
| ***H04L 25/02*** | (2006.01) |
| ***H04W 72/0446*** | (2023.01) |

(52) U.S. Cl.

CPC ........... *H04W 72/0446* (2013.01); *H04L 1/18* (2013.01); *H04L 25/0202* (2013.01)

(58) Field of Classification Search

CPC ... H04W 72/0446; H04L 1/18; H04L 25/0202
See application file for complete search history.

(56) References Cited

U.S. PATENT DOCUMENTS

| | | | | |
|---|---|---|---|---|
| 11,502,721 | B2 * | 11/2022 | Ly | H04L 5/0012 |
| 12,137,436 | B2 * | 11/2024 | Ly | H04W 72/23 |
| 12,256,369 | B2 * | 3/2025 | Yao | H04W 16/14 |
| 2018/0145809 | A1 * | 5/2018 | Kwak | H04L 25/0228 |
| 2020/0068541 | A1 * | 2/2020 | Zhang | H04L 5/0053 |
| 2021/0014095 | A1 | 1/2021 | Ly et al. | |
| 2021/0307070 | A1 * | 9/2021 | Kim | H04L 25/0226 |

(Continued)

FOREIGN PATENT DOCUMENTS

| | | |
|---|---|---|
| CN | 111385880 | 7/2020 |
| EP | 4290961 | 12/2023 |

(Continued)

OTHER PUBLICATIONS

Qualcomm Incorporated, "Joint channel estimation for PUSCH," 3GPP TSG-RAN WG1 Meeting #104b-e, R1-2103180, Apr. 2021.

(Continued)

*Primary Examiner* — Elisabeth Benoit Magloire
(74) *Attorney, Agent, or Firm* — Hodgson Russ LLP

(57) ABSTRACT

Provided are a method for channel estimation, a terminal device, and a network device. The method includes the following. A terminal device determines a first time-domain resource set used for repetitions of first data, based on first indication information received from a network device. The terminal device determines, based on the first time-domain resource set, a second time-domain resource set used for joint channel estimation.

20 Claims, 15 Drawing Sheets

(56) References Cited

U.S. PATENT DOCUMENTS

| | | | | |
|---|---|---|---|---|
| 2022/0303983 | A1* | 9/2022 | Ly | H04L 1/0009 |
| 2022/0322074 | A1* | 10/2022 | Taherzadeh Boroujeni | H04W 72/1273 |
| 2023/0048695 | A1* | 2/2023 | Kim | H04L 25/0224 |
| 2023/0054490 | A1* | 2/2023 | Wong | H04L 1/1854 |
| 2023/0216711 | A1* | 7/2023 | Yao | H04L 5/0051 370/328 |
| 2023/0254896 | A1* | 8/2023 | Guo | H04L 1/08 370/329 |
| 2024/0032024 | A1* | 1/2024 | Dai | H04L 1/08 |
| 2024/0179688 | A1* | 5/2024 | Echigo | H04W 72/0446 |

FOREIGN PATENT DOCUMENTS

| | | | |
|---|---|---|---|
| WO | 2021062813 | 4/2021 | |
| WO | WO-2021123879 A1 * | 6/2021 | H04W 24/08 |
| WO | 2022061628 | 3/2022 | |

OTHER PUBLICATIONS

EPO, Extended European Search Report for EP Application No. 21936338.9, Feb. 12, 2024.

"3rd Generation Partnership Project; Technical Specification Group Radio Access Network; NR; Physical layer procedures for data (Release 16)," 3GPP TS 38.214, Sep. 2020, v16.3.0.

"3rd Generation Partnership Project; Technical Specification Group Radio Access Network; Study on NR coverage enhancements (Release 17)," 3GPP TR 38.830, Dec. 2020, v17.0.0.

Ericsson, "Joint Channel Estimation for PUSCH," 3GPP TSG-RAN WG1 Meeting #104b-e, R1-2103446, Apr. 2021.

WIPO, International Search Report and Written Opinion for International Application No. PCT/CN2021/086712, Jan. 14, 2022.

European Patent Office, Communication Pursuant to Article 94(3) EPC for European Application No. 21936338.9, Jun. 10, 2026.

CNIPA, First Office Action for CN Application No. 202511358223.X, Sep. 2, 2026.

* cited by examiner

METHOD FOR CHANNEL ESTIMATION, TERMINAL DEVICE, AND NETWORK DEVICE

CROSS-REFERENCE TO RELATED APPLICATION(S)

This application is a continuation of International Application No. PCT/CN2021/086712, filed Apr. 12, 2021, the entire disclosure of which is incorporated herein by reference.

TECHNICAL FIELD

This disclosure relates to the field of communication, and more particularly, to a method for channel estimation, a terminal device, and a network device.

BACKGROUND

In a wireless communication system, in order to improve reliability of data transmission, a data repetition mechanism is designed. Generally, in data repetitions, a network device performs channel estimation separately for each transmission.

In order to improve the coverage performance of data transmission, joint channel estimation is introduced in the related art. Joint channel estimation refers to channel estimation based on a demodulation reference signal (DMRS) across multiple transmissions included in repetitions, which can improve accuracy of channel estimation. How to perform joint channel estimation accurately needs to be taken into consideration.

SUMMARY

Implementations of the disclosure provide a method for channel estimation. The method includes the following. A terminal device determines a first time-domain resource set used for repetitions of first data, based on first indication information received from a network device. The terminal device determines, based on the first time-domain resource set, a second time-domain resource set used for joint channel estimation.

Implementations of the disclosure provide a method for channel estimation. The method includes the following. A network device sends first indication information to a terminal device, where the first indication information indicates that the terminal device is to determine a first time-domain resource set used for repetitions of first data, and the first time-domain resource set is used for determining a second time-domain resource set used for joint channel estimation.

Implementations of the disclosure further provide a terminal device. The terminal device includes a processor and a memory. The memory is configured to store computer programs. The processor is configured to invoke and execute the computer programs stored in the memory, to perform the method described above.

Implementations of the disclosure further provide a network device. The network device includes a processor and a memory. The memory is configured to store computer programs. The processor is configured to invoke and execute the computer programs stored in the memory, to perform the method described above.

DETAILED DESCRIPTION

Figure 1:
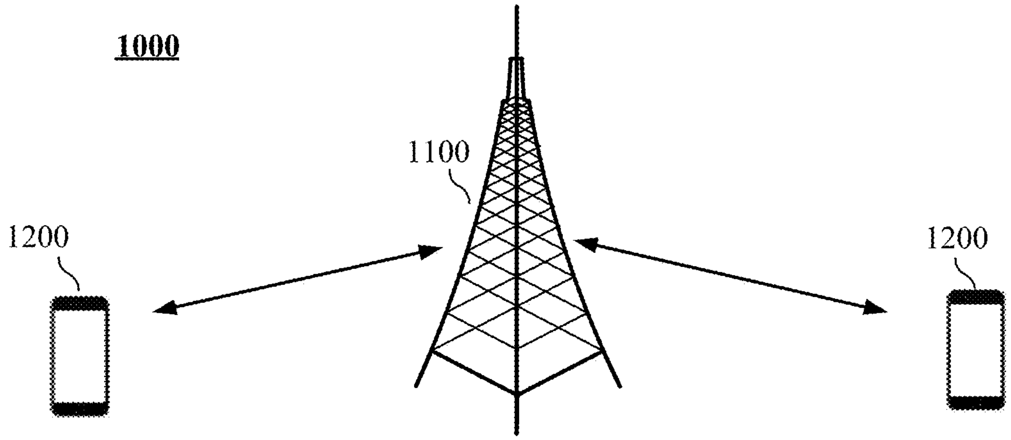
FIG. 1 is a schematic architectural diagram of a communication system according to implementations of the disclosure.

The following will describe technical solutions of implementations of the disclosure with reference to the accompanying drawings in implementations of the disclosure.

The technical solutions of implementations of the disclosure may be applied to various communication systems, for example, a global system of mobile communication (GSM), a code division multiple access (CDMA) system, a wideband code division multiple access (WCDMA) system, a general packet radio service (GPRS), a long term evolution (LTE) system, an advanced LTE (LTE-A) system, a new radio (NR) system, an evolved system of an NR system, an LTE-based access to unlicensed spectrum (LTE-U) system, an NR-based access to unlicensed spectrum (NR-U) system, a non-terrestrial network (NTN) system, a universal mobile telecommunication system (UMTS), a wireless local area network (WLAN), a wireless fidelity (WiFi), a $5^{th}$ generation (5G) system, or other communication systems.

Generally speaking, a conventional communication system generally supports a limited quantity of connections and therefore is easy to implement. However, with development of communication technology, a mobile communication system will not only support conventional communication but also support, for example, device to device (D2D) communication, machine to machine (M2M) communication, machine type communication (MTC), vehicle to vehicle (V2V) communication, or vehicle to everything (V2X) communication, etc. Implementations of the disclosure can also be applied to these communication systems.

Optionally, a communication system in implementations of the disclosure may be applied to a carrier aggregation (CA) scenario, a dual connectivity (DC) scenario, or a standalone (SA) network deployment scenario.

Various implementations of the disclosure are described in connection with a network device and a terminal device. The terminal device may also be referred to as a user equipment (UE), an access terminal, a subscriber unit, a subscriber station, a mobile station, a remote station, a remote terminal, a mobile device, a user terminal, a terminal, a wireless communication device, a user agent, or a user device, etc.

The terminal device may be a station (ST) in a WLAN, a cellular radio telephone, a cordless telephone, a session initiation protocol (SIP) telephone, a wireless local loop (WLL) station, a personal digital assistant (PDA), a handheld device or a computing device with wireless communication functions, or other processing devices coupled with a wireless modem, an in-vehicle device, a wearable device, and a terminal device in a next-generation communication system, for example, a terminal device in an NR network, or a terminal device in a future evolved public land mobile network (PLMN), etc.

In implementations of the disclosure, the terminal device can be deployed on land, which includes indoor or outdoor, handheld, wearable, or in-vehicle. The terminal device can also be deployed on water (such as ships, etc.). The terminal device can also be deployed in the air (such as airplanes, balloons, satellites, etc.).

In implementations of the disclosure, the terminal device can be a mobile phone, a pad, a computer with wireless transceiver functions, a virtual reality (VR) terminal device, an augmented reality (AR) terminal device, a wireless terminal device in industrial control, a wireless terminal device in self driving, a wireless terminal device in remote medicine, a wireless terminal device in smart grid, a wireless terminal device in transportation safety, a wireless terminal device in smart city, or a wireless terminal device in smart home, etc.

By way of explanation rather than limitation, in implementations of the disclosure, the terminal device may also be a wearable device. The wearable device may also be called a wearable smart device, which is a generic term of wearable devices obtained through intelligentization design and development on daily wearing products with wearable technology, for example, glasses, gloves, watches, clothes, accessories, and shoes. The wearable device is a portable device that can be directly worn or integrated into clothes or accessories of a user. In addition to being a hardware device, the wearable device can also realize various functions through software support, data interaction, and cloud interaction. A wearable smart device in a broad sense includes, for example, a smart watch or smart glasses with complete functions and large sizes and capable of realizing independently all or part of functions of a smart phone, and for example, various types of smart bands and smart jewelries for physical monitoring, of which each is dedicated to application functions of a certain type and required to be used together with other devices such as a smart phone.

In implementations of the disclosure, the network device may be a device for communicating with a mobile device, and the network device may be an access point (AP) in a WLAN, a base transceiver station (BTS) in GSM or CDMA, may also be a Node B (NB) in WCDMA, and may also be an evolutional Node B (eNB or eNodeB) in LTE, or a relay station or AP, or an in-vehicle device, a wearable device, a network device (gNB) in an NR network, a network device in a future evolved PLMN, or a network device in an NTN, etc.

By way of explanation rather than limitation, in implementations of the disclosure, the network device may be mobile. For example, the network device may be a mobile device. Optionally, the network device may be a satellite or a balloon base station. For example, the satellite may be a low earth orbit (LEO) satellite, a medium earth orbit (MEO) satellite, a geostationary earth orbit (GEO) satellite, a high elliptical orbit (HEO) satellite, etc. Optionally, the network device may also be a base station deployed on land or water.

In implementations of the disclosure, the network device provides services for a cell, and the terminal device communicates with the network device on a transmission resource (for example, a frequency-domain resource or a spectrum resource) for the cell. The cell may be a cell corresponding to the network device (for example, a base station). The cell may belong to a macro base station, or may belong to a base station corresponding to a small cell. The small cell may include: a metro cell, a micro cell, a pico cell, a femto cell, and the like. These small cells are characterized by small coverage and low transmission power and are adapted to provide data transmission service with high-rate.

FIG. 1 schematically illustrates one network device 1100 and two terminal devices 1200. Optionally, the wireless communication system 1000 may include multiple network devices 1100, and there can be other quantities of terminal devices in a coverage area of each of the network devices 1100. Implementations of the disclosure are not limited in this regard. Optionally, the wireless communication system 1000 illustrated in FIG. 1 may further include other network entities such as a mobility management entity (MME), an access and mobility management function (AMF), etc., and implementations of the disclosure are not limited in this regard.

It should be understood that, in implementations of the disclosure, a device with communication functions in a network/system can be referred to as a "communication device". Taking the communication system illustrated in FIG. 1 as an example, the communication device may include the network device and the terminal device(s) that have communication functions. The network device and the terminal device(s) can be the devices in implementations of the disclosure and will not be elaborated again herein. The communication device may further include other devices such as a network controller, an MME, or other network entities in the communication system, and implementations of the disclosure are not limited in this regard.

It should be understood that, the terms "system" and "network" herein are usually used interchangeably throughout this disclosure. The term "and/or" herein only describes an association relationship between associated objects, which means that there can be three relationships. For example, A and/or B can mean A alone, both A and B exist, and B alone. In addition, the character "/" herein generally indicates that the associated objects are in an "or" relationship.

It should be understood that, "indication" referred to in implementations of the disclosure may be a direct indication, may be an indirect indication, or may mean that there is an association relationship. For example, A indicates B may mean that A directly indicates B, for instance, B can be obtained according to A; may mean that A indirectly indicates B, for instance, A indicates C, and B can be obtained according to C; or may mean that that there is an association relationship between A and B.

In the elaboration of implementations of the disclosure, the term "correspondence" may mean that there is a direct or indirect correspondence between the two, may mean that there is an association between the two, or may mean a relationship of indicating and indicated or configuring and configured, etc.

In order for better understanding of the technical solutions of implementations of the disclosure, the related art of implementations of the disclosure will be described below. The following related art as optional solutions may be arbitrarily combined with the technical solutions of implementations of the disclosure, which shall all fall within the protection scope of implementations of the disclosure.

In an NR system, a network device sends uplink (UL) grant information, for example, downlink control information (DCI) format 0_0 or DCI format 0_1, so as to schedule physical uplink shared channel (PUSCH) transmission.

When scheduling UL data transmission by UL grant information, the network device will carry a time domain resource assignment (TDRA) field in DCI. The TDRA field is 6-bit data, and is indicative of one of 16 rows in a resource allocation table.

Each row in the resource allocation table defines multiple types of resource allocation information, for example, PUSCH starting symbol S, PUSCH length L, time interval information $K_2$, and a mapping type, etc. $K_2$ represents a slot offset between a slot where the UL grant information is located and a slot where the PUSCH is located. The PUSCH mapping type includes Type A and Type B. The difference between Type A and Type B lies in the value range of S and the value range of L. Type A is mainly intended for a slot-based scheduling service, and therefore S is relatively close to the start of a slot and L is relatively large. Type B is mainly intended for a non-slot-based scheduling service such as ultra reliability and low latency communication (URLLC) and has high requirements on delay, and therefore, S is relatively flexible so as to facilitate transmission of service data arriving at any time, and L is relatively small so as to reduce transmission delay.

The value ranges of S and L for Type A and Type B are given in Table 1 below.

TABLE 1

| PUSCH | Normal value range | | | Extended value range | | |
|---|---|---|---|---|---|---|
| mapping type | S | L | S + L | S | L | S + L |
| Type A | 0 | {4, . . . , 14} | {4, . . . , 14} for Type A only | 0 | {4, . . . , 12} | {4, . . . , 12} |
| Type B | {0, . . . , 13} | {1, . . . , 14} | {1, . . . , 14} for Type A, {1, . . . , 27} for Type B | {0, . . . , 11} | {1, . . . , 12} | {1, . . . , 12} |

A PUSCH time-domain resource allocation table is Table 2 below.

TABLE 2

| Resource index | PUSCH mapping type | $K_2$ | S | L |
|---|---|---|---|---|
| 1 | Type A | j | 0 | 14 |
| 2 | Type A | j | 0 | 12 |
| 3 | Type A | j | 0 | 10 |
| 4 | Type B | j | 2 | 10 |
| 5 | Type B | j | 4 | 10 |
| 6 | Type B | j | 4 | 8 |
| 7 | Type B | j | 4 | 6 |
| 8 | Type A | j + 1 | 0 | 14 |
| 9 | Type A | j + 1 | 0 | 12 |
| 10 | Type A | j + 1 | 0 | 10 |
| 11 | Type A | j + 2 | 0 | 14 |
| 12 | Type A | j + 2 | 0 | 12 |
| 13 | Type A | j + 2 | 0 | 10 |
| 14 | Type B | j | 8 | 6 |
| 15 | Type A | j + 3 | 0 | 14 |
| 16 | Type A | j + 3 | 0 | 10 |

j is a slot where the UL grant information is located.

In order to improve reliability of UL transmission, slot aggregation-based PUSCH repetitions are introduced in NR release 15 (R15). Slot aggregation-based PUSCH repetitions refer to K repetitions of the same transport block (TB) by applying different redundancy versions (RV). The network device configures the maximum number K of repetitions for a terminal device via a higher-layer parameter pusch-AggregationFactor. The terminal device transmits repeatedly the same TB in K consecutive slots, and a PUSCH repetition carrying the TB in each slot occupies the same number of symbols in time domain. An RV for the $1^{st}$ PUSCH repetition is indicated by the UL grant information such as DCI, and RVs for the remaining PUSCH repetitions are determined based on a cyclic sequence of a set {0, 2, 3, 1}. RV identities (ID) $RV_{id}$ are given in Table 3 below.

TABLE 3

| | $RV_{id}$ to be applied to $n^{th}$ transmission occasion | | | |
|---|---|---|---|---|
| $RV_{id}$ indicated by DCI | n mod 4 = 0 | n mod 4 = 1 | n mod 4 = 2 | n mod 4 = 3 |
| 0 | 0 | 2 | 3 | 1 |
| 2 | 2 | 3 | 1 | 0 |

TABLE 3-continued

| $RV_{id}$ indicated by DCI | $RV_{id}$ to be applied to $n^{th}$ transmission occasion | | | |
|---|---|---|---|---|
| | n mod 4 = 0 | n mod 4 = 1 | n mod 4 = 2 | n mod 4 = 3 |
| 3 | 3 | 1 | 0 | 2 |
| 1 | 1 | 0 | 2 | 3 |

Figure 2:
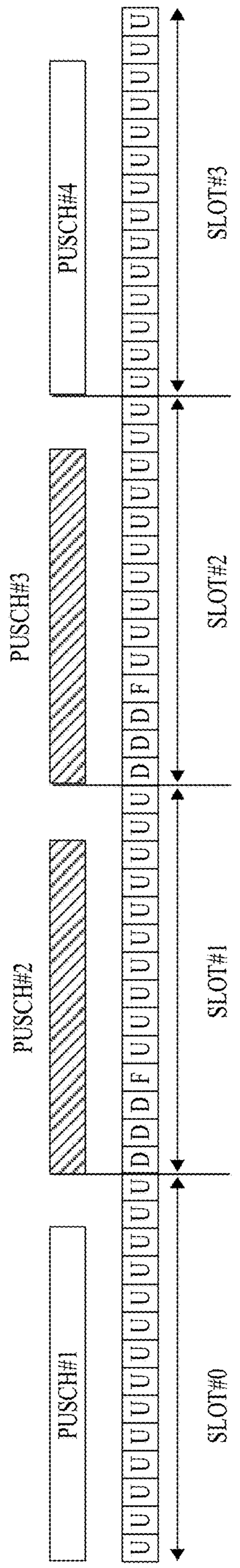
FIG. 2 is a schematic diagram illustrating time-domain resources for physical uplink shared channel (PUSCH) repetitions according to implementations of the disclosure.

If a time-domain resource corresponding to a PUSCH repetition in a slot where the PUSCH repetition is located has at least one semi-static downlink (DL) symbol, the PUSCH will not be transmitted in the slot. FIG. 2 is a schematic diagram illustrating time-domain resources for PUSCH repetitions. A network device configures a terminal device to transmit repeatedly a TB four times, and PUSCH repetitions carrying the TB need to occupy the first twelve symbols in each slot. In FIG. 2, U represents an UL symbol, D represents a semi-static DL symbol, and F represents a flexible symbol. Since the first three symbols in each of slot #1 and slot #2 are semi-static DL symbols D, the $2^{nd}$ PUSCH (PUSCH #2) to be transmitted in slot #1 and the $3^{rd}$ PUSCH (PUSCH #3) to be transmitted in slot #2 will be dropped, that is, not transmitted.

For UL configured-grant slot aggregation-based PUSCH repetitions, the network device configures the maximum number of repetitions for a TB via a higher-layer parameter RepK.

In NR release 16 (R16), for PUSCH repetition Type B, the network device sends UL grant information or configured grant configuration information to indicate one or more nominal PUSCH repetitions.

The terminal device transmits one or more actual PUSCH repetitions in one slot, or transmits two or more actual PUSCH repetitions across multiple available consecutive slots. As described above, the network device implements time-domain resource assignment by indicating a certain row in the TDRA table. According to the NR R16, a new column is added in the TDRA table for indicating the number of repetitions (numberofrepetitions) in PUSCH repetition Type B, where the value of numberofrepetitions may be {1, 2, 3, 4, 7, 8, 12, 16}.

The UL scheduling information or Type 1 configured grant configuration information indicates a starting symbol S and a duration L for the $1^{st}$ nominal PUSCH repetition, and a duration L for each nominal PUSCH repetition is the same, where $0 \leq S \leq 13$ and $1 \leq L \leq 14$. In higher-layer signaling, four bits are used to indicate S and another four bits are used to indicate L, so that $S+L>14$ can be fulfilled. A transport block size (TBS) for a nominal PUSCH repetition and a TBS for an actual PUSCH repetition may be determined according to a time domain length L for the nominal PUSCH. Starting from the $2^{nd}$ nominal PUSCH, a starting symbol for a nominal PUSCH repetition is a next symbol of an ending symbol for the previous nominal PUSCH repetition.

Before determining a time-domain resource for an actual PUSCH repetition, the terminal device needs to determine an invalid symbol(s), and symbols other than the invalid symbol(s) can be considered as potentially valid symbols. If a time-domain resource corresponding to a nominal PUSCH repetition has at least one potentially valid symbol that is consecutive within the same slot, the at least one potentially valid symbol may be mapped to an actual PUSCH repetition. Therefore, a time-domain resource for a nominal PUSCH repetition may consist of time-domain resources for one or more actual PUSCH repetitions. In addition, the terminal device will omit an actual PUSCH repetition with a single symbol except for the case where the single symbol is a duration L for a nominal PUSCH indicated by the network device.

Figure 3:
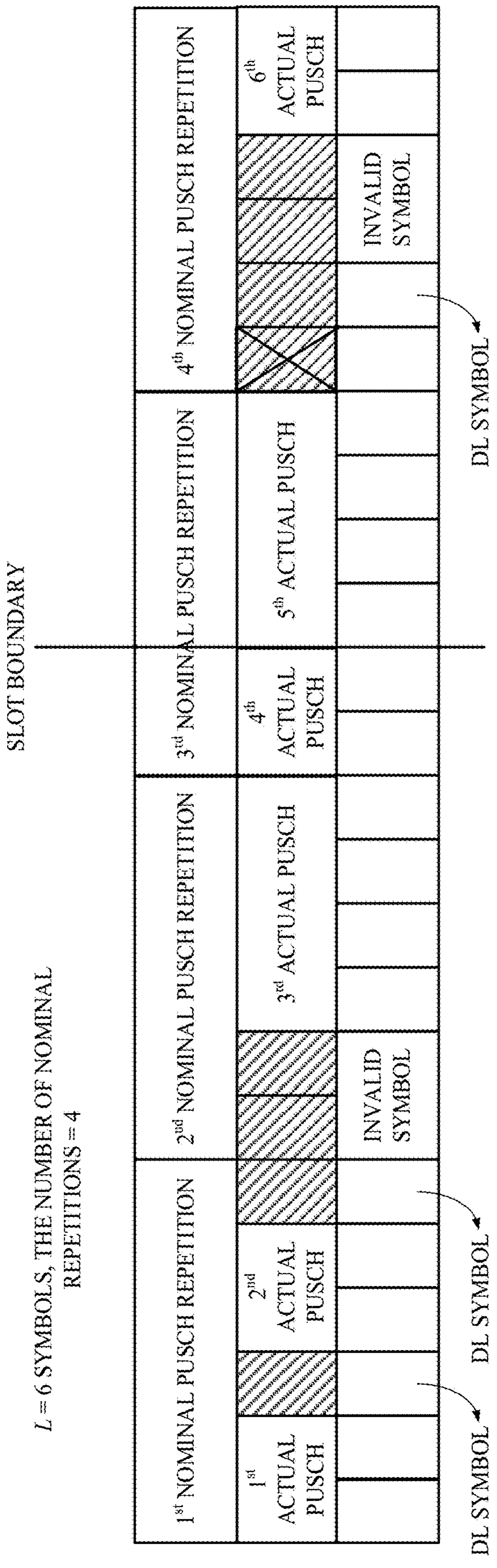
FIG. 3 is a schematic diagram illustrating another time-domain resources for PUSCH repetitions according to implementations of the disclosure.

FIG. 3 is a schematic diagram illustrating exemplary time-domain resources for PUSCH repetitions. As illustrated in FIG. 3, a length L for a nominal PUSCH is six symbols, the number of nominal repetitions is four, and accordingly, four nominal PUSCH repetitions are contained in twenty-four symbols. For each nominal PUSCH repetition, a DL symbol or other invalid symbols in six symbols corresponding to the nominal PUSCH repetition are not used for actual PUSCH transmission. Taking the $3^{rd}$ nominal PUSCH repetition as an example, six symbols corresponding to the $3^{rd}$ nominal PUSCH repetition are all potentially valid symbols, and accordingly, in the six symbols, the $1^{st}$ symbol and the $2^{nd}$ symbol that are consecutive within one slot are mapped to an actual PUSCH, and the $3^{rd}$ symbol to the $6^{th}$ symbol that are consecutive within another one slot are mapped to another actual PUSCH. Taking the $4^{th}$ nominal PUSCH repetition as an example, the $1^{st}$ symbol, the $5^{th}$ symbol, and the $6^{th}$ symbol in six symbols corresponding to the $4^{th}$ nominal PUSCH repetition are potentially valid symbols, where the $1^{st}$ symbol is not consecutive with other potentially valid symbols and therefore is not used for actual PUSCH transmission, and the $5^{th}$ symbol and the $6^{th}$ symbol are consecutive within the same slot and therefore can be mapped to an actual PUSCH.

In the above scheme, the terminal device can determine an invalid symbol as follows:

1. A symbol that is semi-statically configured as DL via a higher-layer parameter tdd-UL-DL-ConfigurationCommon or tdd-UL-DL-ConfigurationDedicated is considered as an invalid symbol.

2. An invalid symbol is determined according to an invalid symbol pattern InvalidSymbolPattern configured via higher-layer signaling. InvalidSymbolPattern has multiple bits corresponding to multiple symbols, and a bit value equal to 1 indicates that a corresponding symbol is an invalid symbol. DCI format 0_1 or DCI format 0_2 is used for scheduling PUSCH repetitions or activating Type 2 configured grant PUSCH repetitions. The DCI may be configured with a 1-bit invalid symbol pattern indicator field. If the invalid symbol pattern indicator field is set to 1, the terminal device will determine an invalid symbol according to the invalid symbol pattern; otherwise, the terminal device will not apply the invalid symbol pattern. If the DCI is not configured with the invalid symbol pattern indicator field, the terminal device will determine an invalid symbol directly according to the invalid symbol pattern. Different DCI formats are separately configured with the invalid symbol pattern indicator field.

For PUSCH repetition Type A, an NR system supports adding a column indicative of numberofrepetitions in the time-domain resource allocation table configured via higher-layer signaling so as to indicate the number K of PUSCH repetition Type A. If numberofrepetitions is not configured, the number K of repetitions will be determined based on pusch-AggregationFactor. If neither of the two parameters is configured, K=1.

For configured grant PUSCH scheduling:

A configured-grant PUSCH repetition type may be determined as follows. If a higher-layer parameter PUSCHRepTypeIndicatorForType1Configuredgrant is configured and set to "pusch-RepTypeB", PUSCH repetition type B will be applied; otherwise, PUSCH repetition type A will be applied. The number of configured-grant repetitions may be determined as follows. If numberofrepetitions is present in the time-domain resource allocation table, the number of nominal PUSCH repetitions will be indicated by a TDRA table; otherwise, the number of repetitions will be indicated by a higher-layer parameter repK.

As can be seen, the number of PUSCH repetitions is semi-statically configured. Since the system supports a flexible slot structure, PUSCH repetitions in some slots will be omitted, and as a result, time-domain resources for actual PUSCH repetitions will be non-consecutive. Therefore, in some configuration scenarios, especially in a time division duplex (TDD) scenario, it is hard to realize an ideal coverage enhancement performance with the configured number of repetitions.

Figure 4:
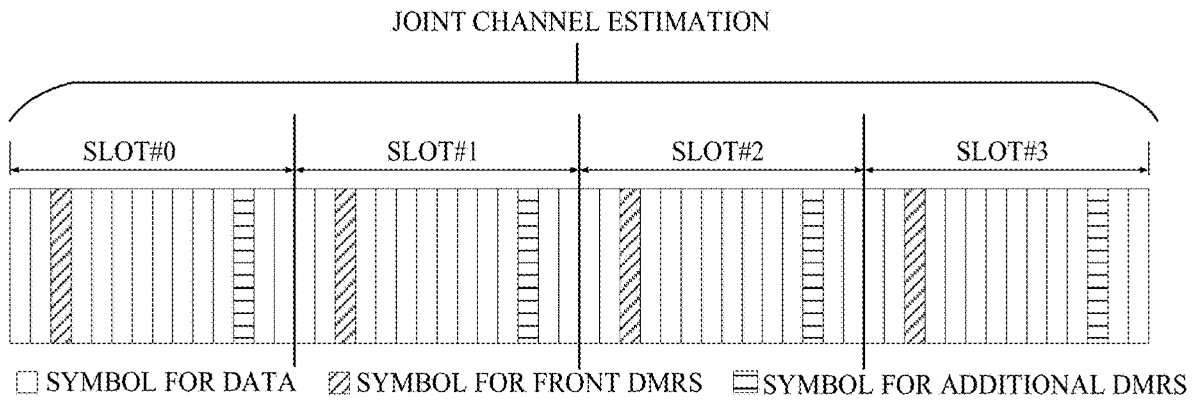
FIG. 4 is a schematic diagram illustrating joint channel estimation over consecutive slots according to implementations of the disclosure.

In joint channel estimation, it is necessary to determine the number of slots for joint channel estimation or the number of PUSCH repetitions, so as to determine a corresponding time-domain range. Within the corresponding time-domain range, the network device assumes that a demodulation reference signal (DMRS) is relevant (for example, the DMRS is consistent in at least one of power, antenna port, or precoding and/or continuous in phase), and performs joint channel estimation based on such assumptions. Accordingly, the terminal device is expected to realize these assumptions related to joint channel estimation in PUSCH transmission. FIG. 4 is a schematic diagram illustrating joint channel estimation over consecutive slots. The terminal device needs to perform joint channel estimation based on a front DMRS and an additional DMRS in slot #0 to slot #3 used for PUSCH repetitions, and keep a configuration that is related to joint channel estimation. However, since time-domain resources for actual PUSCH repetitions are non-consecutive, it is difficult for the terminal device to cooperate with the network device to realize corresponding configurations (that is, to keep the DMRS consistent in power, antenna port, or precoding and/or continuous in phase) during the entire PUSCH repetitions.

The solutions provided in implementations of the disclosure are mainly intended for solving at least one of the problems described above.

In order for more comprehensive understanding of the features and technical content of implementations of the disclosure, implementations of the disclosure will be described in detail below with reference to the accompanying drawings. The accompanying drawings herein are only intended for illustration rather than limitation of implementations of the disclosure.

Figure 5:
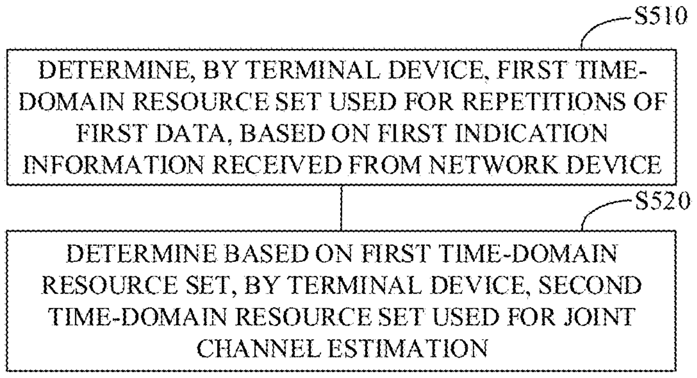
FIG. 5 is a schematic flowchart of a method for channel estimation according to implementations of the disclosure.

FIG. 5 is a schematic flowchart of a method for channel estimation according to implementations of the disclosure. The method may optionally be applied to the system illustrated in FIG. 1, but is not limited thereto. The method includes the following.

Step S510, a terminal device determines, based on first indication information received from a network device, a first time-domain resource set used for repetitions of first data.

Step S520, the terminal device determines, based on the first time-domain resource set, a second time-domain resource set used for joint channel estimation.

In implementations of the disclosure, the second time-domain resource set can have at least one time-domain resource used for joint channel estimation. That is, the network device performs joint channel estimation on the time-domain resource in the second time-domain resource set. Accordingly, the terminal device keeps a configuration that is associated with joint channel estimation on the second time-domain resource set.

Optionally, the method may further include the following. The terminal device transmits the first data on the second time-domain resource set based on a signal configuration corresponding to joint channel estimation.

Optionally, the signal configuration corresponding to joint channel estimation includes at least one of: power consistency, antenna port consistency, precoding consistency, or phase continuity.

Figure 6:
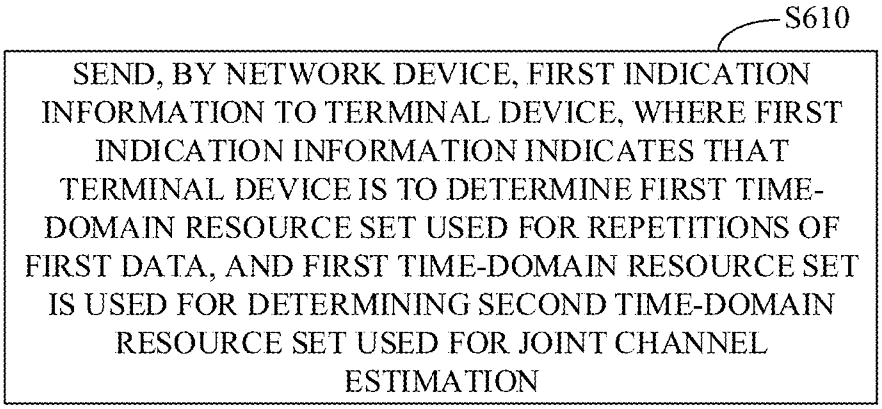
FIG. 6 is a schematic flowchart of a method for channel estimation according to other implementations of the disclosure.

Corresponding to the foregoing method, refer to FIG. 6, which illustrates a method for channel estimation provided in other implementations of the disclosure. The method may optionally be applied to the system illustrated in FIG. 1, but is not limited thereto. The method includes the following.

Step S610, a network device sends first indication information to a terminal device, where the first indication information indicates that the terminal device is to determine a first time-domain resource set used for repetitions of first data, and the first time-domain resource set is used for determining a second time-domain resource set used for joint channel estimation.

Optionally, the method further includes the following. The network device performs joint channel estimation for the first data on the second time-domain resource set. In other words, the network device performs joint channel estimation for the first data on at least one time-domain resource in the second time-domain resource set.

Exemplarily, the first data may include a PUSCH.

In implementations of the disclosure, the first time-domain resource set for repetitions of the first data may include a slot(s) or a symbol(s) for actual transmission of the first data. For example, regarding UL data transmission Type A, the first time-domain resource set may include at least one slot, and at least one symbol corresponding to a PUSCH repetition in the slot does not include any semi-static DL symbol. Regarding UL data transmission Type B, the first time-domain resource set may include a symbol corresponding to an actual PUSCH.

It should be noted that, the first time-domain resource set may include consecutive time-domain resources, or may include discrete time-domain resources. The second time-domain resource set may include consecutive time-domain resources, or may include discrete time-domain resources. Here, the time-domain resource may include a slot and/or a symbol.

Optionally, the first indication information may include at least one of: UL grant information, configured grant indication information, or second window-length indication information.

Optionally, the UL grant information may include DCI such as DCI format 0_0 or DCI format 0_1. The terminal device may determine a time-domain range for repetitions according to the UL grant information, and determine the first time-domain resource set for repetitions of the first data based on a slot structure (or symbol configuration) of each slot in the time-domain range for repetitions.

Optionally, the configured grant indication information may include information for configuring a scheduling-free resource, or if the scheduling-free resource is configured, the configured grant indication information may include information for activating some scheduling-free resource. The terminal device can determine a valid scheduling-free resource according to the configured grant indication information. If some or all of scheduling-free resource is to be used for repetitions, the terminal device can determine, from the scheduling-free resource, the first time-domain resource set that can be used for repetitions of the first data. If the scheduling-free resource is configured or activated, the network device may also determine, from the scheduling-free resource, the first time-domain resource set that can be used for repetitions of the first data.

Optionally, besides carrying the UL grant information or the configured grant indication information to indicate the first time-domain resource set, the first indication information may further carry the second window-length indication information, so that the terminal device can determine the second time-domain resource set according to the second window-length indication information. The second window-length indication information may be indicative of information which is related to the length of a time-domain window (i.e. the length of a time-domain interval or the length of a time-domain range) and used for determining the second time-domain resource set, for example, a nominal window length, a threshold window length, a threshold interval, or the like. Exemplarily, the nominal window length may be used for determining a nominal window from a time-domain range corresponding to the first time-domain resource set, so as to determine the second time-domain resource set in the nominal window. Exemplarily, the threshold window length may include the length of a consecutive time-domain range corresponding to the second time-domain resource set or the threshold number of time-domain resources in the second time-domain resource set. Exemplarily, the threshold interval may include a threshold length of a time-domain interval where interruption is allowed or the threshold number of time-domain resources where interruption is allowed in the second time-domain resource set.

In implementations of the disclosure, before performing joint channel estimation for the first data on the second time-domain resource set, the network device may also determine the second time-domain resource set based on the first time-domain resource set. Specifically, the method may further include the following. The network device determines the second time-domain resource set based on the first time-domain resource set.

In implementations of the disclosure, the network device or the terminal device can determine the second time-domain resource set based on the first time-domain resource set in various manners. Various exemplary implementations thereof will be given below.

Example 1: The network device determines the second time-domain resource set based on the first time-domain resource set as follows. The network device determines the first time-domain resource set as the second time-domain resource set, where the first time-domain resource set has at least two time-domain resources.

Accordingly, the terminal device determines, based on the first time-domain resource set, the second time-domain resource set used for joint channel estimation as follows. The terminal device determines the first time-domain resource set as the second time-domain resource set, where the first time-domain resource set has at least two time-domain resources.

Optionally, the time-domain resource includes a slot or a symbol.

Figure 7:
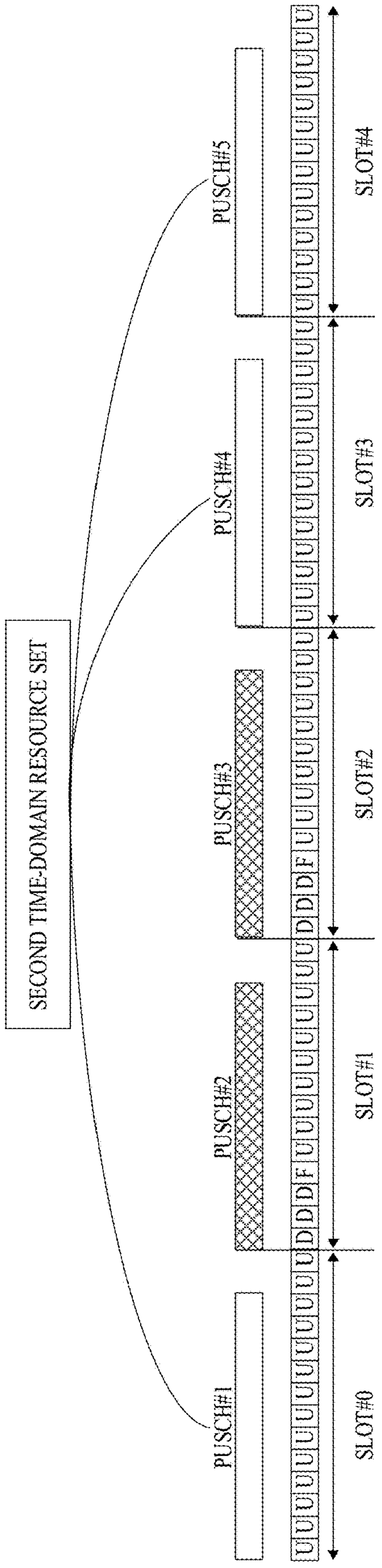
FIG. 7 is schematic diagram I illustrating a second time-domain resource set according to implementations of the disclosure.

For example, as illustrated in FIG. 7, for UL data transmission Type A, a time-domain range for PUSCH repetitions (hereinafter, "repetition time-domain range" for short) includes five slots, which are slot #0 to slot #4 respectively. A time-domain resource corresponding to PUSCH #2 in slot #1 includes three DL symbols D, and a time-domain resource corresponding to PUSCH #3 in slot #2 includes three DL symbols D, and therefore, PUSCH repetitions will not be performed in slot #1 and slot #2. Accordingly, the first time-domain resource set for PUSCH repetitions includes slot #0, slot #3, and slot #4. Therefore, slot #0, slot #3, and slot #4 are determined as the second time-domain resource set, that is, the second time-domain resource set includes slot #0, slot #3, and slot #4. The network device performs joint channel estimation based on slot #0, slot #3, and slot #4, and the terminal device keeps power consistency, antenna port consistency, precoding consistency, and/or phase continuity in slot #0, slot #3, and slot #4.

Figure 8:
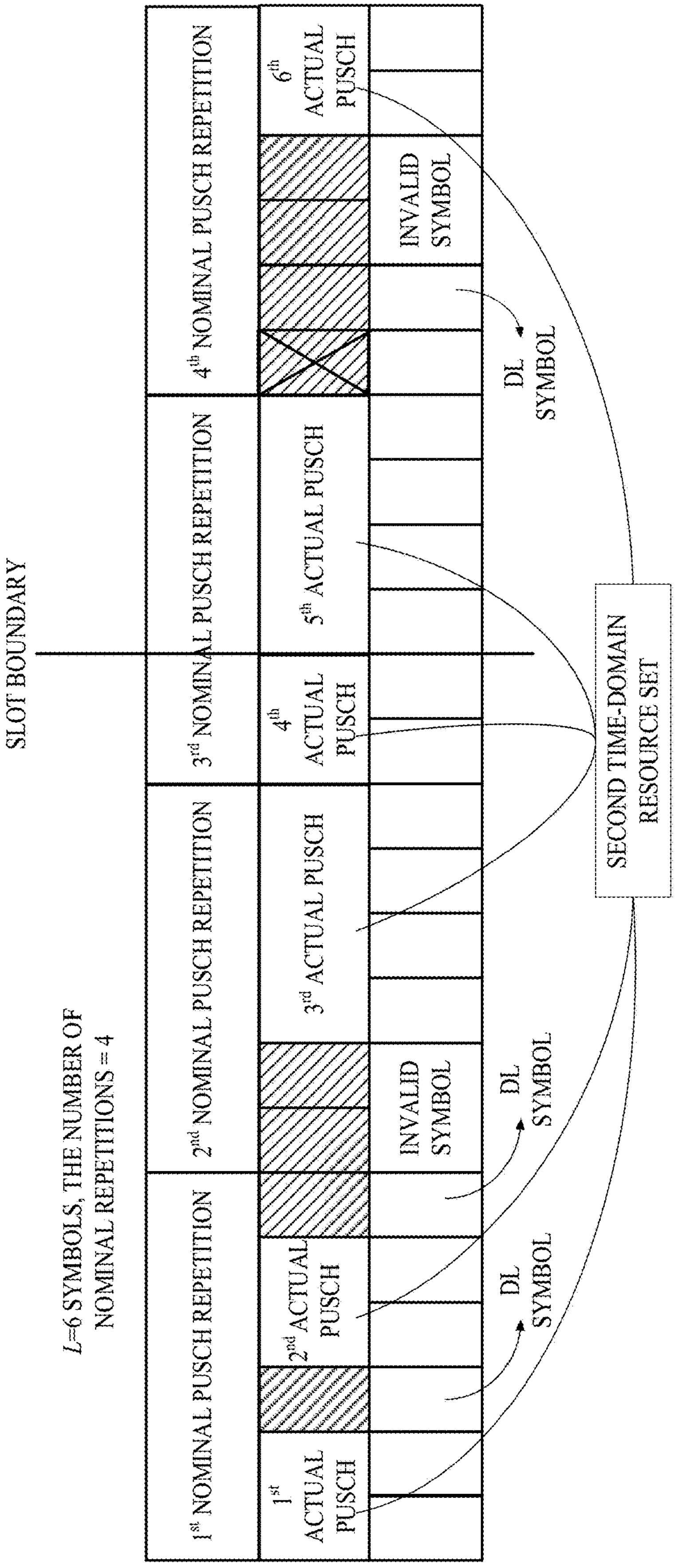
FIG. 8 is schematic diagram II illustrating a second time-domain resource set according to implementations of the disclosure.

For another example, as illustrated in FIG. 8, for UL data transmission Type B, a repetition time-domain range includes twenty-four symbols, which correspond to four nominal PUSCH repetitions. The first time-domain resource set for PUSCH repetitions includes symbols occupied by six actual PUSCHs. The terminal device determines these symbols as the second time-domain resource set used for joint channel estimation. That is, the second time-domain resource set includes the symbols occupied by the six actual PUSCHs. The network device performs joint channel estimation based on the symbols occupied by the six actual PUSCHs. The terminal device keeps power consistency, antenna port consistency, precoding consistency, and/or phase continuity on the symbols occupied by the six actual PUSCHs.

Example 2: The network device determines the second time-domain resource set based on the first time-domain resource set as follows. The network device obtains the second time-domain resource set based on M time-domain resources having a preset relationship in the first time-domain resource set, where M is an integer and M≥1.

Accordingly, the terminal device determines, based on the first time-domain resource set, the second time-domain resource set used for joint channel estimation as follows. The terminal device obtains the second time-domain resource set based on the M time-domain resources having the preset relationship in the first time-domain resource set, where M is an integer and M≥1.

Exemplarily, the network device or the terminal device may determine the M time-domain resources having the preset relationship in the first time-domain resource set as the second time-domain resource set.

Optionally, the preset relationship includes being consecutive in time domain. Accordingly, M≥2. That is, the terminal device obtains the resource set for joint channel estimation based on at least two time-domain resources that are consecutive in time domain in the first time-domain resource set.

Optionally, the time-domain resource may include a slot or a symbol.

Figure 9:
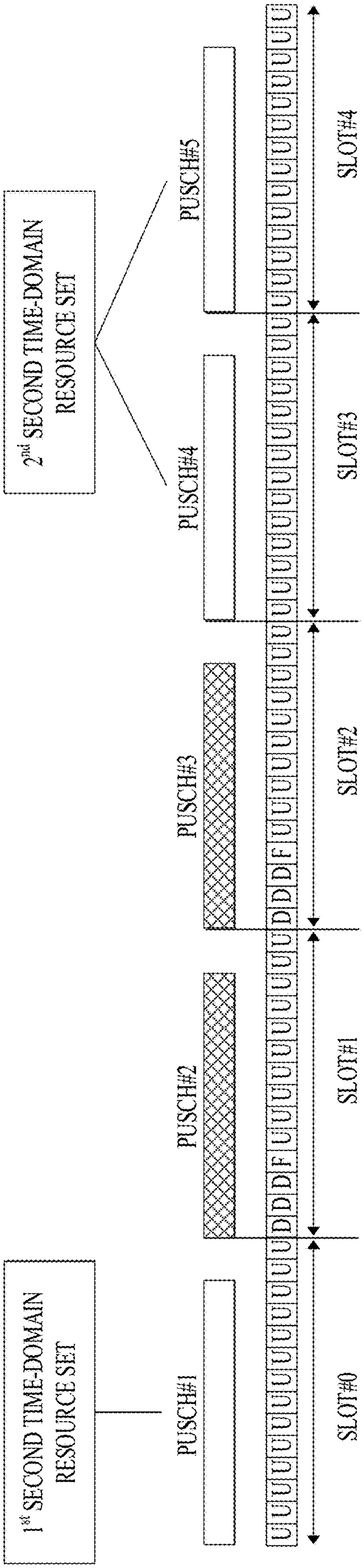
FIG. 9 is schematic diagram III illustrating a second time-domain resource set according to implementations of the disclosure.

For example, as illustrated in FIG. 9, the first time-domain resource set for PUSCH repetitions includes slot #0, slot #3, and slot #4. Slot #0 is not consecutive with other slots that can be used for PUSCH data transmission, and therefore, slot #0 is determined as the second time-domain resource set for joint channel estimation and denoted as the $1^{st}$ second time-domain resource set. Slot #3 and slot #4 are consecutive in time domain, and therefore, slot #3 and slot #4 can be determined as the second time-domain resource set and denoted as the $2^{nd}$ second time-domain resource set.

Figure 10:
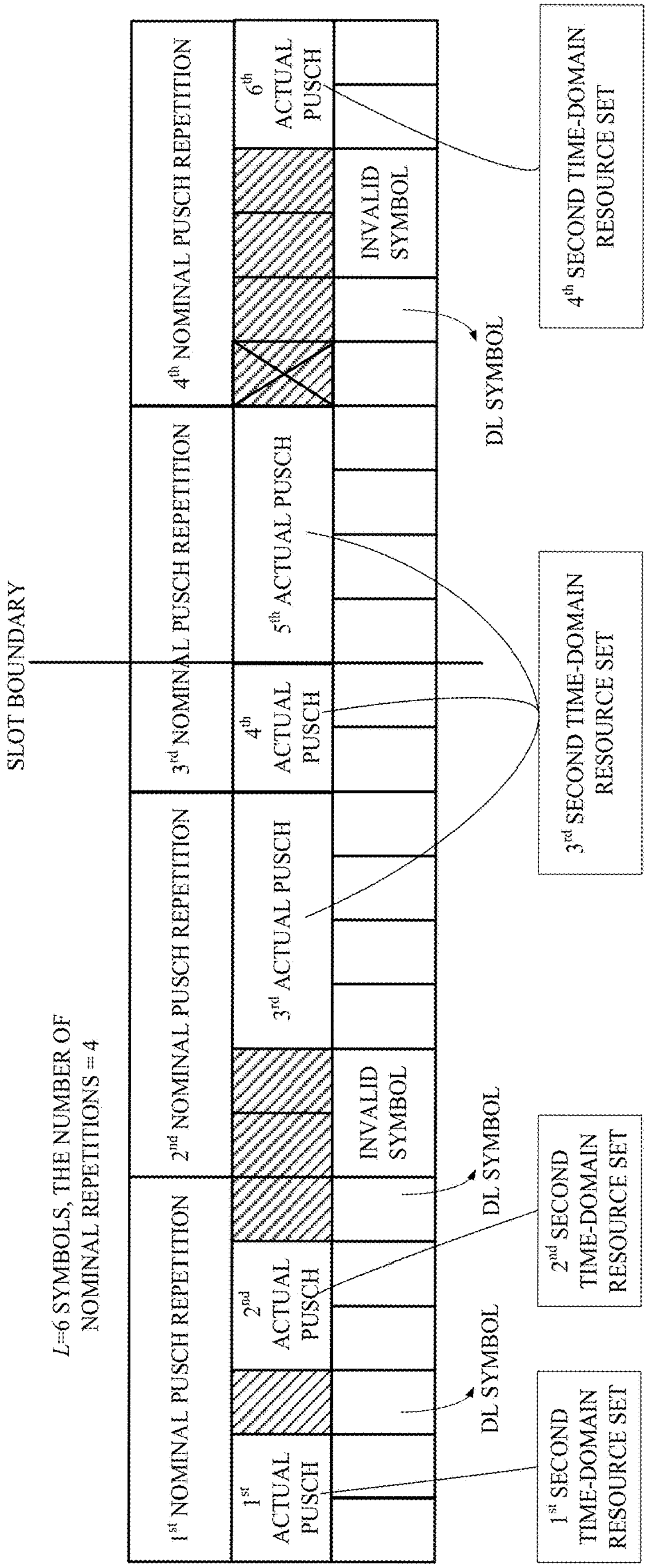
FIG. 10 is schematic diagram IV illustrating a second time-domain resource set according to implementations of the disclosure.

For another example, as illustrated in FIG. 10, the first time-domain resource set for PUSCH repetitions includes symbols occupied by six actual PUSCHs. Two symbols occupied by the $1^{st}$ actual PUSCH are consecutive in time domain, and therefore, the two symbols occupied by the $1^{st}$ actual PUSCH may be determined as the second time-domain resource set and denoted as the $1^{st}$ second time-domain resource set. Similarly, two symbols occupied by the $2^{nd}$ actual PUSCH may be determined as the $2^{nd}$ second time-domain resource set, ten symbols occupied by the $3^{rd}$ actual PUSCH, the $4^{th}$ actual PUSCH, and the $5^{th}$ actual PUSCH may be determined as the $3^{rd}$ second time-domain resource set, and two symbols occupied by the $6^{th}$ actual PUSCH may be determined as the $4^{th}$ second time-domain resource set.

Optionally, if some time-domain resource, such as a third time-domain resource, in the first time-domain resource set is not consecutive with any other time-domain resource in the first time-domain resource set in time domain, the terminal device or the network device may determine the third time-domain resource as the second time-domain resource set. In some scenarios, it may also be considered that the third time-domain resource is used for single channel estimation or independent channel estimation.

For example, as illustrated in FIG. 9, slot #0 can be used for repetitions of the first data and is not consecutive with other resources in the first time-domain resource set. Therefore, slot #0 can be determined as the $1^{st}$ second time-domain resource set.

Optionally, M is less than or equal to a preconfigured threshold number of resources. If the M time-domain resources are consecutive in time domain, the threshold number of resources may also be considered as a threshold window length.

Figure 11:
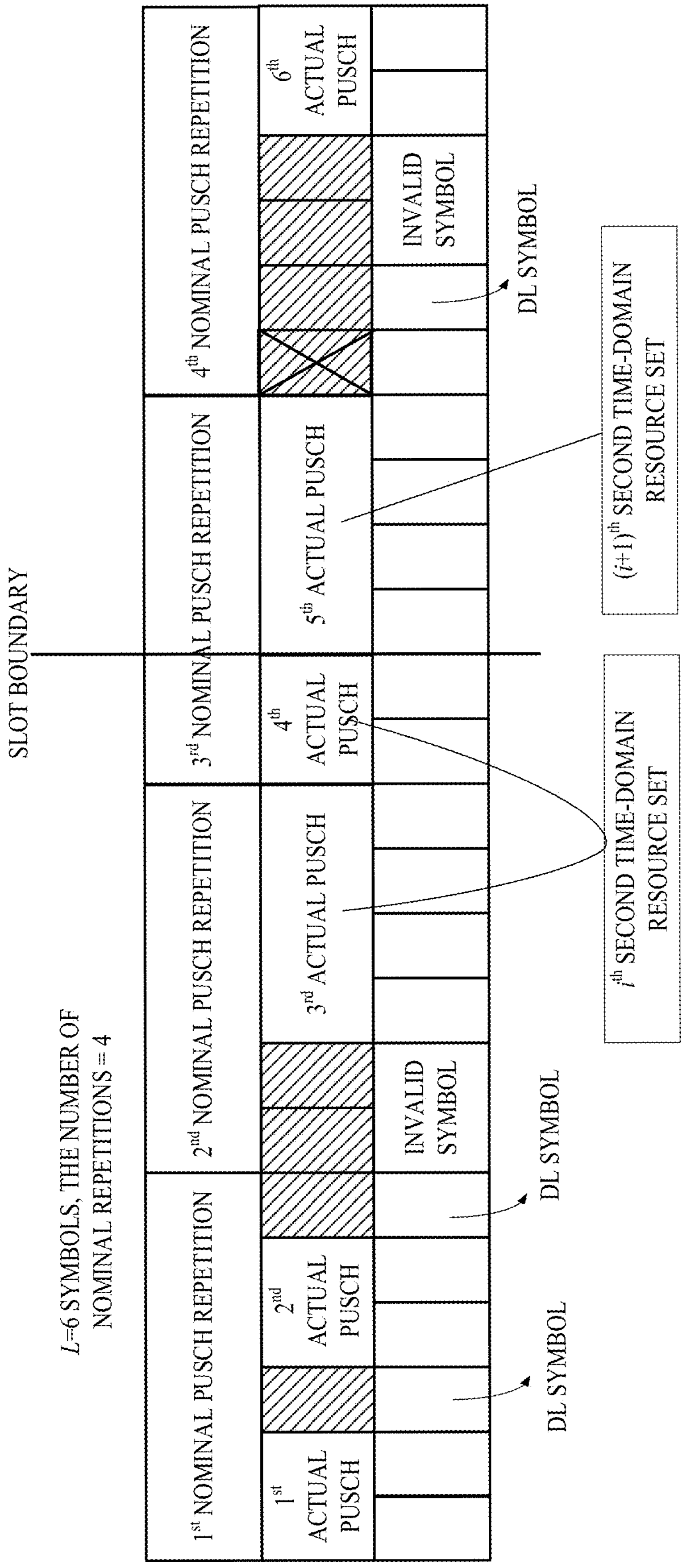
FIG. 11 is schematic diagram V illustrating a second time-domain resource set according to implementations of the disclosure.

For example, M=6. As illustrated in FIG. 11, the time-domain resource set for repetitions of the first data includes symbols occupied by six actual PUSCHs. Ten symbols occupied by the $3^{rd}$ actual PUSCH, the $4^{th}$ actual PUSCH, and the $5^{th}$ actual PUSCH are consecutive in time domain, but the number of symbols is greater than the threshold number of resources. The terminal device and the network device determine the first six symbols (namely, symbols occupied by the $3^{rd}$ actual PUSCH and the $4^{th}$ actual PUSCH) that are consecutive in time domain as the $i^{th}$ second time-domain resource set, and determine the last four symbols (namely, symbols occupied by the $5^{th}$ actual PUSCH) that are consecutive in time domain as the $(i+1)^{th}$ second time-domain resource set.

Optionally, the method may further include the following. If a time interval between a first time-domain resource in the first time-domain resource set and a second time-domain resource in the first time-domain resource set is less than or equal to a threshold interval, the terminal device and/or the network device determines that the first time-domain resource and the second time-domain resource have the preset relationship.

That is, if a time interval between two time-domain resources in a time-domain resource set is less than the threshold interval, the two time-domain resources have the preset relationship. It can be understood that, according to the foregoing optional implementation, the preset relationship includes: a length of interruption in time domain is less than or equal to the threshold interval. From another perspective, if the length of interruption in time domain between the M time-domain resources is less than or equal to the threshold interval, that is, a time interval between two time-domain resources in the M time-domain resources is less than the threshold interval, the interval between the two time-domain resources can be ignored, and the M time-domain resources can be determined as the second time-domain resource set.

Figure 12:
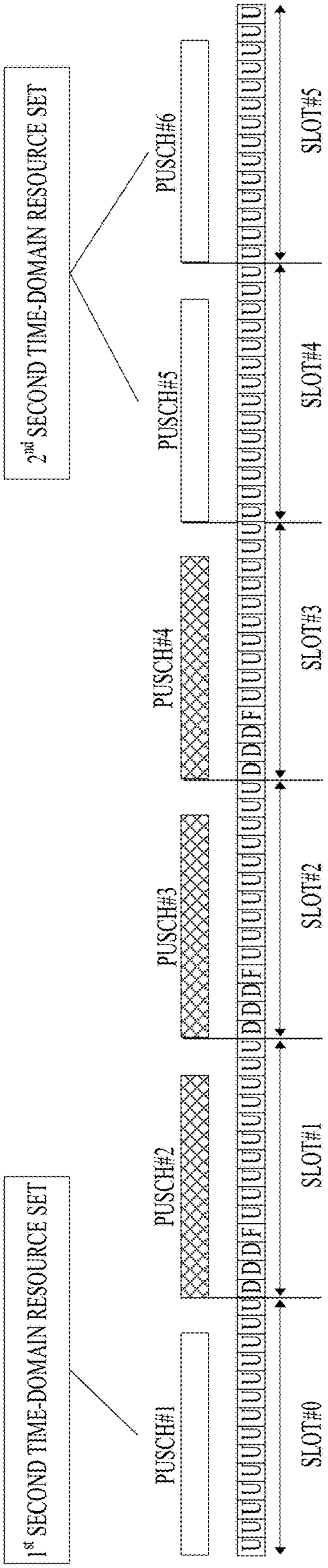
FIG. 12 is schematic diagram VI illustrating a second time-domain resource set according to implementations of the disclosure.

For example, the threshold interval is two slots. As illustrated in FIG. 7, the first time-domain resource set for PUSCH repetitions includes slot #0, slot #3, and slot #4. A time interval between slot #0 and slot #3 is equal to two slots, and a time interval between slot #3 and slot #4 is zero (less than two slots), and accordingly, slot #0, slot #3, and slot #4 have the preset relationship. Therefore, the terminal device or the network device determines slot #0, slot #3, and slot #4 as the second time-domain resource set. As illustrated in FIG. 12, the first time-domain resource set for PUSCH repetitions includes slot #0, slot #4, and slot #5. A time interval between slot #0 and slot #4 is greater than two slots, and a time interval between slot #4 and slot #5 is zero (less than two slots), and accordingly, slot #0 and slot #4 are not in the preset relationship and slot #4 and slot #5 have the preset relationship. Therefore, the terminal device or the network device determines slot #4 and slot #5 as the $2^{nd}$ second time-domain resource set, and determines slot #0 separately as the $1^{st}$ second time-domain resource set.

Figure 13:
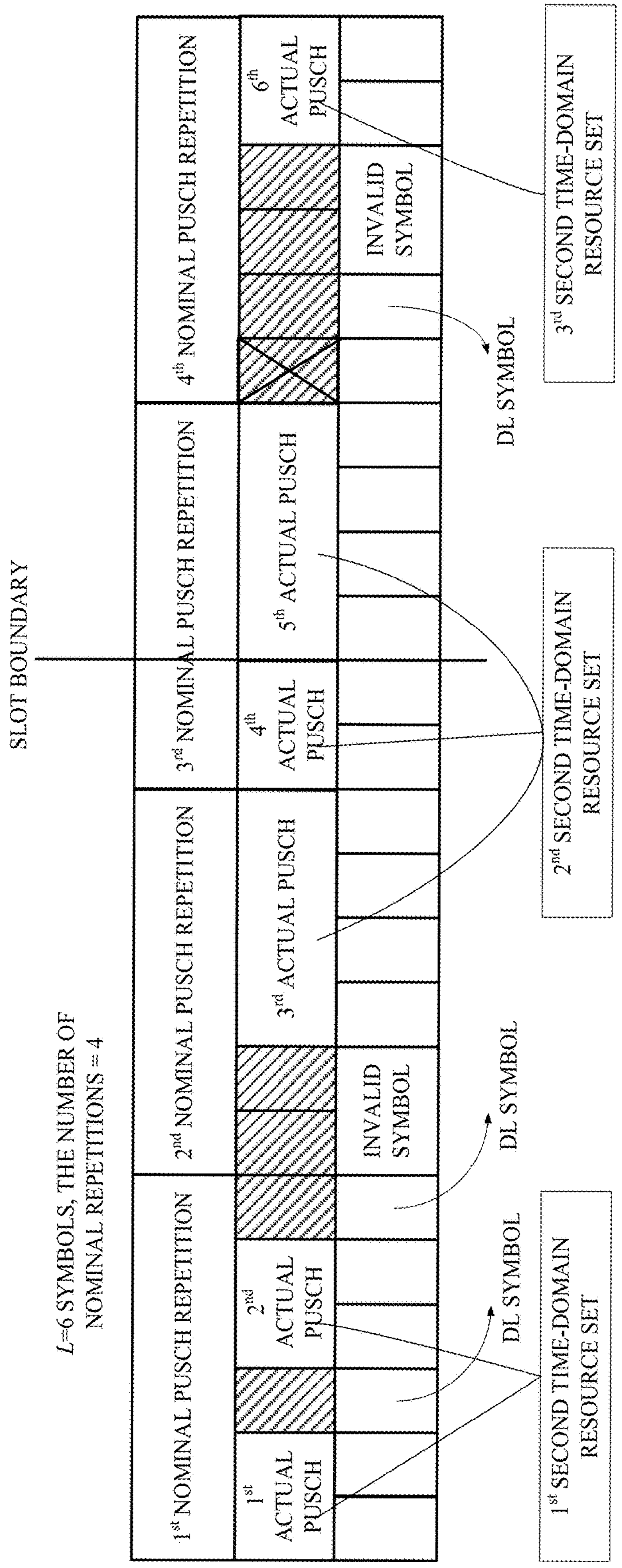
FIG. 13 is schematic diagram VII illustrating a second time-domain resource set according to implementations of the disclosure.

For another example, the threshold interval is two symbols. As illustrated in FIG. 13, the first time-domain resource set for PUSCH repetitions includes symbols occupied by six actual PUSCHs. A time interval between a symbol(s) occupied by the $1^{st}$ actual PUSCH and a symbol occupied by the $2^{nd}$ actual PUSCH is less than the threshold interval, and accordingly, the symbol occupied by the 1st actual PUSCH and the symbol occupied by the $2^{nd}$ actual PUSCH have the preset relationship, and the $1^{st}$ second time-domain resource set includes the symbol(s) occupied by the 1st actual PUSCH and the symbol(s) occupied by the $2^{nd}$ actual PUSCH. A time interval between a symbol occupied by the $2^{nd}$ actual PUSCH and a symbol occupied by the $3^{rd}$ actual PUSCH is greater than the threshold interval, and accordingly, the symbol occupied by the $2^{nd}$ actual PUSCH and the symbol occupied by the $3^{rd}$ actual PUSCH are not in the preset relationship, and the symbol(s) occupied by the $2^{nd}$ actual PUSCH and the symbol(s) occupied by the $3^{rd}$ actual PUSCH belong to different second time-domain resource sets.

Example 3: The network device determines a window for joint channel estimation based on a time-domain resource set as follows. The network device determines N nominal windows in a time-domain range corresponding to the first time-domain resource set according to a nominal window length, where N is an integer and N≥1. The network device obtains, in an $i^{th}$ nominal window of the N nominal windows, the second time-domain resource set based on M time-domain resources which belong to the first time-domain resource set and have a preset relationship, where i is an integer and 1≤i≤N, and M is an integer and M≥1.

Accordingly, the terminal device determines, based on the first time-domain resource set, the second time-domain resource set used for joint channel estimation as follows. The terminal device determines the N nominal windows in the time-domain range corresponding to the first time-domain resource set according to the nominal window length, where N is an integer and N≥1. The terminal device obtains, in the $i^{th}$ nominal window of the N nominal windows, the second time-domain resource set based on the M time-domain resources which belong to the first time-domain resource set and have the preset relationship, where i is an integer and 1≤i≤N, and M is an integer and M≥1.

Here, the time-domain range corresponding to the first time-domain resource set may refer to a time-domain interval starting from the $1^{st}$ time-domain resource in the first time-domain resource set and ending at the last time-domain resource in the first time-domain resource set.

According to Example 3, the time-domain range corresponding to the first time-domain resource set may be divided into at least one nominal window based on a preset nominal window length. For example, the window length is twenty symbols, and the time-domain range corresponding to the first time-domain resource set is forty symbols, and accordingly, the time-domain range corresponding to the first time-domain resource set may be divided into two nominal windows. Then, in each nominal window, the M time-domain resources which belong to the first time-domain resource set and have the preset relationship are determined as a joint channel window.

Optionally, the time-domain resource includes a slot or a symbol.

Optionally, M is less than or equal to a pre-configured threshold number of resources.

Optionally, the preset relationship includes being consecutive in time domain.

Optionally, the method may further include the following. If a time interval between a first time-domain resource in the first time-domain resource set and a second time-domain resource in the first time-domain resource set is less than or equal to a threshold interval, the terminal device and/or the network device determines that the first time-domain resource and the second time-domain resource have the preset relationship.

In practice, Example 2 above can be considered as the case where N=1 in Example 3, that is, the time-domain range corresponding to the first time-domain resource set can be considered as one nominal window. It can be understood that, for the manner of obtaining the second time-domain resource set based on the M time-domain resources in each nominal window, reference can be made to the manner of obtaining the second time-domain resource set based on the M time-domain resources in the first time-domain resource set in Example 2, which will not be described in detail again herein.

Optionally, the network device may send second indication information to the terminal device, so as to indicate to perform joint channel estimation and trigger determining a joint channel window by the terminal device. Specifically, the method may further include the following. The network device sends the second indication information to the terminal device, where the second indication information indicates to perform joint channel estimation.

Accordingly, the terminal device determines, based on the first time-domain resource set, the second time-domain resource set used for joint channel estimation as follows. On condition that the second indication information is received from the network device, the terminal device determines, based on the first time-domain resource set, the second time-domain resource set used for joint channel estimation, where the second indication information indicates to perform joint channel estimation.

Optionally, the second indication information includes at least one of: information for enabling joint channel estimation or first window-length indication information.

Optionally, the first window-length indication information may indicate at least one of: a nominal window length, a threshold window length, the threshold number of resources, or a threshold interval in the foregoing exemplary implementations. If the window-length indication information is received, the terminal device determines that the network device is to perform joint channel estimation, and therefore determines the second time-domain resource set for joint channel estimation based on the first time-domain resource set indicated by the first indication information.

The configurations and implementations of implementations of the disclosure are described above from different perspectives with reference to various implementations. According to at least one of the foregoing implementations, the terminal device can determine the first time-domain resource set for repetitions of the first data based on the first indication information sent by the network device, and determine the second time-domain resource set for joint channel estimation based on the first time-domain resource set. As such, based on the second time-domain resource set, the terminal device can cooperate with the network device for performing joint channel estimation accurately.

Figure 14:
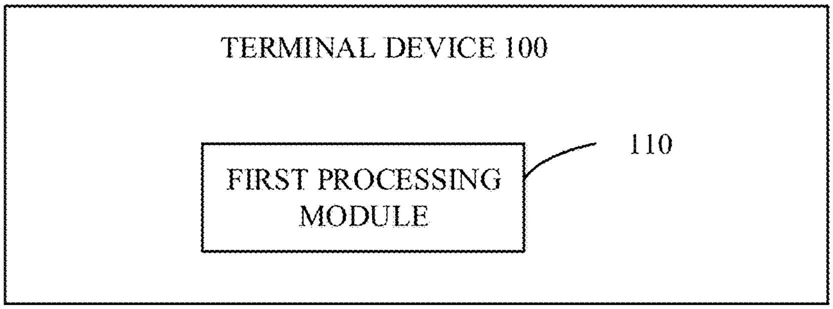
FIG. 14 is a schematic structural block diagram of a terminal device according to implementations of the disclosure.

Corresponding to at least one of the foregoing implementations, implementations of the disclosure further provide a terminal device 100. Referring to FIG. 14, the terminal device 100 includes a first processing module 110. The first processing module 110 is configured to determine, based on first indication information received from a network device, a first time-domain resource set used for repetitions of first data; and determine, based on the first time-domain resource set, a second time-domain resource set for used joint channel estimation.

Optionally, the first processing module 110 is further configured to transmit the first data on the second time-domain resource set based on a signal configuration corresponding to joint channel estimation.

Optionally, the signal configuration corresponding to joint channel estimation includes at least one of: power consistency, antenna port consistency, precoding consistency, or phase continuity.

Optionally, the first processing module 110 is configured to determine the first time-domain resource set as the second time-domain resource set, where the first time-domain resource set has at least two time-domain resources.

Optionally, the first processing module 110 is configured to obtain the second time-domain resource set based on M time-domain resources having a preset relationship in the first time-domain resource set, where M is an integer and M≥1.

Optionally, the first processing module 110 is configured to: determine N nominal windows in a time-domain range corresponding to the first time-domain resource set according to a nominal window length, where N is an integer and N≥1; and obtain, in an $i^{th}$ nominal window of the N nominal windows, the second time-domain resource set based on M time-domain resources which belong to the first time-domain resource set and have a preset relationship, where i is an integer and 1≥i≤N, and M is an integer and M≥1.

Optionally, M is less than or equal to a pre-configured threshold number of resources.

Optionally, the preset relationship includes being consecutive in time domain.

Optionally, the first processing module 110 is further configured to determine that a first time-domain resource in the first time-domain resource set and a second time-domain resource in the first time-domain resource set have the preset relationship, if a time interval between the first time-domain resource and the second time-domain resource is less than or equal to a threshold interval.

Optionally, the time-domain resource includes a slot or a symbol.

Optionally, the first processing module 110 is configured to on condition that second indication information is received from the network device, determine, based on the first time-domain resource set, the second time-domain resource set used for joint channel estimation, where the second indication information indicates to perform joint channel estimation.

Optionally, the second indication information includes at least one of: information for enabling joint channel estimation or first window-length indication information.

Optionally, the first indication information includes at least one of: UL grant information, configured grant indication information, or second window-length indication information.

The terminal device 100 in implementations of the disclosure can implement corresponding functions of the terminal device in the foregoing method implementations. For the procedure, function, implementation, and advantage corresponding to each module (sub-module, unit, or assembly, etc.) in the terminal device 100, reference can be made to the corresponding illustrations in the foregoing method implementations, which will not be described in detail again herein. It should be noted that, the functions of various modules (sub-modules, units, or assemblies, etc.) in the terminal device 100 described in implementations of the disclosure may be implemented by different modules (sub-modules, units, or assemblies, etc.), or may be implemented by the same module (sub-module, unit, or assembly, etc.). For example, the first transmitting module and the second transmitting module may be different modules or may be the same module, both of which can implement the corresponding functions thereof in implementations of the disclosure. In addition, the communicating module in implementations of the disclosure may be implemented by a transceiver of a device, and some or all of the other modules may be implemented by a processor of the device.

Figure 15:
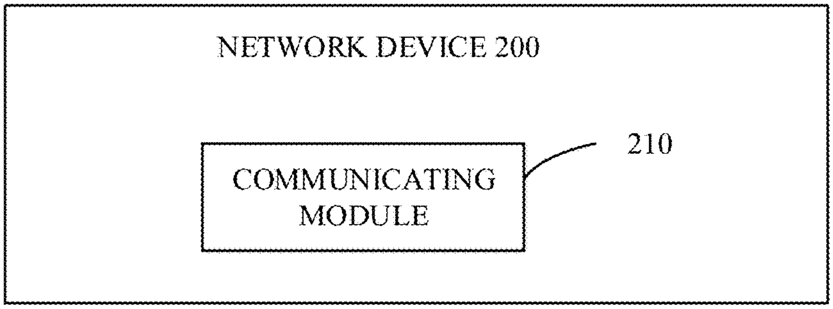
FIG. 15 is a schematic structural block diagram of a network device according to implementations of the disclosure.

FIG. 15 is a schematic block diagram of a network device 200 according to implementations of the disclosure. The network device 200 may include a communicating module 210. The communicating module 210 is configured to send first indication information to a terminal device, where the first indication information indicates that the terminal device is to determine a first time-domain resource set used for repetitions of first data, and the first time-domain resource set is used for determining a second time-domain resource set used for joint channel estimation.

Figure 16:
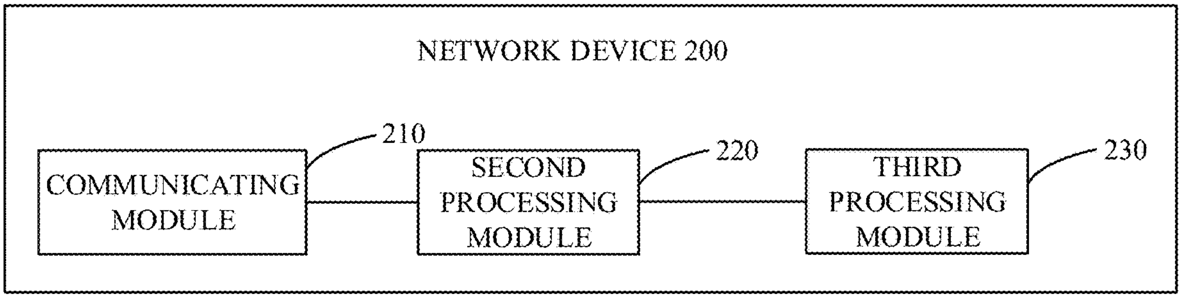
FIG. 16 is a schematic structural block diagram of a network device according to other implementations of the disclosure.

Optionally, as illustrated in FIG. 16, the network device 200 further includes a second processing module 220. The second processing module 220 is configured to perform joint channel estimation for the first data on the second time-domain resource set.

Optionally, as illustrated in FIG. 16, the network device 200 further includes a third processing module 230. The third processing module 230 is configured to determine the second time-domain resource set based on the first time-domain resource set.

Optionally, the third processing module 230 is configured to determine the first time-domain resource set as the second time-domain resource set, where the first time-domain resource set has at least two time-domain resources.

Optionally, the third processing module 230 is configured to obtain the second time-domain resource set based on M time-domain resources having a preset relationship in the first time-domain resource set, wherein M is an integer and M≥1.

Optionally, the third processing module 230 is configured to: determine N nominal windows in a time-domain range corresponding to the first time-domain resource set according to a nominal window length, wherein N is an integer and N≥1; and obtain, in an $i^{th}$ nominal window of the N nominal windows, the second time-domain resource set based on M time-domain resources which belong to the first time-domain resource set and have a preset relationship, wherein i is an integer and 1≤i≤N, and M is an integer and M≥1.

Optionally, M is less than or equal to a preconfigured threshold number of resources.

Optionally, the preset relationship includes being consecutive in time domain.

Optionally, the third processing module 230 is further configured to determine that a first time-domain resource in the first time-domain resource set and a second time-domain resource in the first time-domain resource set have the preset relationship, when a time interval between the first time-domain resource and the second time-domain resource is less than or equal to a threshold interval.

Optionally, the time-domain resource includes a slot or a symbol.

Optionally, the communicating module 210 is further configured to send second indication information to the terminal device, where the second indication information indicates to perform joint channel estimation.

Optionally, the second indication information includes at least one of: information for enabling joint channel estimation or first window-length indication information.

The network device 200 in implementations of the disclosure can implement corresponding functions of the network device in the foregoing method implementations. For the procedure, function, implementation, and advantage corresponding to each module (sub-module, unit, or assembly, etc.) in the network device 200, reference can be made to the corresponding illustrations in the foregoing method implementations, which will not be described in detail again herein. It should be noted that, the functions of various modules (sub-modules, units, or assemblies, etc.) in the network device 200 described in implementations of the disclosure may be implemented by different modules (sub-modules, units, or assemblies, etc.), or may be implemented by the same module (sub-module, unit, or assembly, etc.). For example, the first transmitting module and the second transmitting module may be different modules or may be the same module, both of which can implement the corresponding functions thereof in implementations of the disclosure. In addition, the communicating module in implementations of the disclosure may be implemented by a transceiver of a device, and some or all of the other modules may be implemented by a processor of the device.

Figure 17:
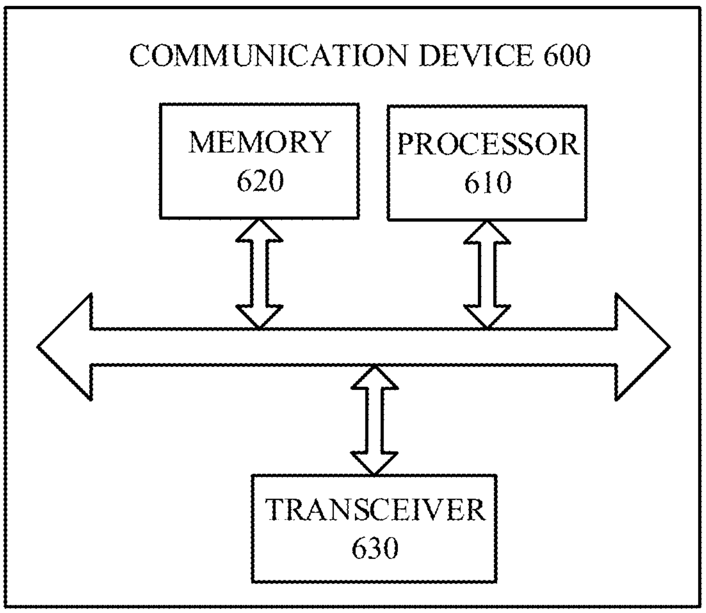
FIG. 17 is a schematic block diagram of a communication device according to implementations of the disclosure.

FIG. 17 is a schematic structural diagram of a communication device 600 according to implementations of the disclosure. The communication device 600 includes a processor 610. The processor 610 can invoke and execute computer programs stored in a memory, to perform the method in implementations of the disclosure.

Optionally, the communication device 600 may further include the memory 620. The processor 610 can invoke and execute the computer programs stored in the memory 620, to perform the method in implementations of the disclosure.

The memory 620 may be a separate device independent of the processor 610, or may be integrated into the processor 610.

Optionally, the communication device 600 may further include a transceiver 630. The processor 610 can control the transceiver 630 to communicate with other devices, specifically, to transmit information or data to other devices or to receive information or data transmitted by other devices.

The transceiver 630 may include a transmitter and a receiver. The transceiver 630 may further include an antenna, where one or more antennas can be provided.

Optionally, the communication device 600 may be operable as the network device in implementations of the disclosure, and the communication device 600 can implement the operations performed by the network device in various methods in implementations of the disclosure, which will not be repeated herein for the sake of brevity.

Optionally, the communication device 600 may be operable as the terminal device in implementations of the disclosure, and the communication device 600 can implement the operations performed by the terminal device in various methods in implementations of the disclosure, which will not be repeated herein for the sake of brevity.

Figure 18:
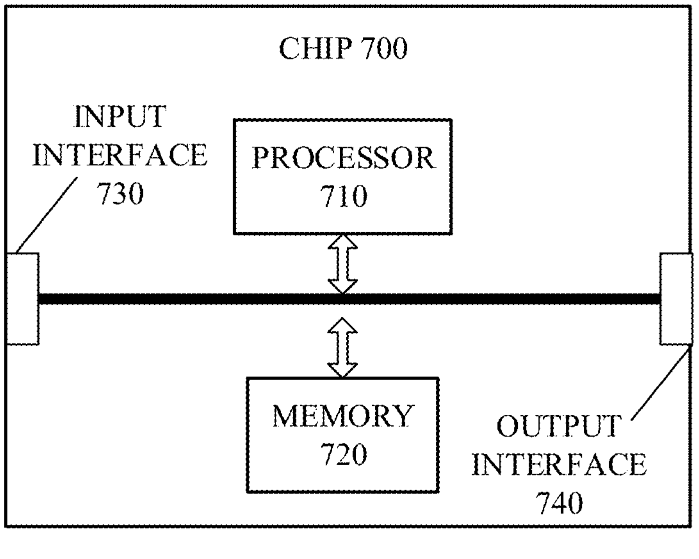
FIG. 18 is a schematic block diagram of a chip according to implementations of the disclosure.

FIG. 18 is a schematic structural diagram of a chip 700 according to implementations of the disclosure. The chip 700 includes a processor 710. The processor 710 can invoke and execute computer programs stored in a memory to perform the method in implementations of the disclosure.

Optionally, the chip 700 further includes the memory 720. The processor 710 can invoke and execute the computer programs stored in the memory 720 to perform the method in implementations of the disclosure.

The memory 720 may be a separate device independent of the processor 710, or may be integrated into the processor 710.

Optionally, the chip 700 may further include an input interface 730. The processor 710 can control the input interface 730 to communicate with other devices or chips, specifically, to obtain information or data transmitted by other devices or chips.

Optionally, the chip 700 may further include an output interface 740. The processor 710 can control the output interface 740 to communicate with other devices or chips, specifically, to output information or data to other devices or chips.

Optionally, the chip is applicable to the network device in implementations of the disclosure. The chip can implement the operations performed by the network device in various methods in implementations of the disclosure, which will not be repeated herein for the sake of brevity.

Optionally, the chip is applicable to the terminal device in implementations of the disclosure. The chip can implement the operations performed by the terminal device in various methods in implementations in the disclosure, which will not be repeated herein for the sake of brevity.

It should be understood that, the chip referred to in implementations of the disclosure may also be referred to as a system-on-chip (SOC).

The foregoing processor may be a general-purpose processor, a digital signal processor (DSP), a field programmable gate array (FPGA), an application specific integrated circuit (ASIC), or other programmable logic devices, transistor logic devices, or discrete hardware components, etc. The general-purpose processor may be a microprocessor or any conventional processor.

The memory mentioned above may be a volatile memory or a non-volatile memory, or may include both a volatile memory and a non-volatile memory. The non-volatile memory may be a read-only memory (ROM), a programmable ROM (PROM), an erasable PROM (EPROM), an electrically EPROM (EEPROM), or a flash memory. The volatile memory may be a random access memory (RAM).

It should be understood that, the memory above is intended for illustration rather than limitation. For example, the memory in implementations of the disclosure may also be a static RAM (SRAM), a dynamic RAM (DRAM), a synchronous DRAM (SDRAM), a double data rate SDRAM (DDR SDRAM), an enhanced SDRAM (ESDRAM), a synch link DRAM (SLDRAM), and a direct rambus RAM (DR RAM), etc. In other words, the memory in implementations of the disclosure is intended to include, but is not limited to, these and any other suitable types of memory.

Figure 19:
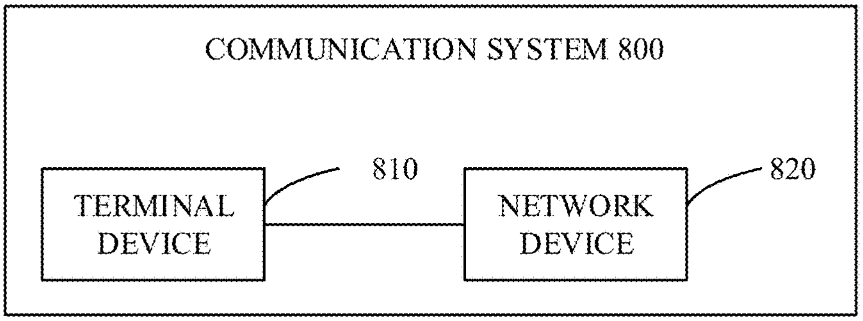
FIG. 19 is a schematic block diagram of a communication system according to implementations of the disclosure.

FIG. 19 is a schematic block diagram of a communication system 800 according to implementations of the disclosure. The communication system 800 includes a terminal device 810 and a network device 820.

The terminal device 810 may be configured to implement corresponding functions implemented by the terminal device in the methods of various implementations of the disclosure, and the network device 820 may be configured to implement corresponding functions implemented by the network device in the methods of various implementations of the disclosure, which will not be described in detail again herein for the sake of brevity.

All or some the foregoing implementations can be implemented through software, hardware, firmware, or any other combination thereof. When implemented by software, all or some the foregoing implementations can be implemented in the form of a computer program product. The computer program product includes one or more computer instructions. When the computer instructions are applied and executed on a computer, all or some of the operations or functions of the implementations of the disclosure are performed. The computer can be a general-purpose computer, a special-purpose computer, a computer network, or other programmable apparatuses. The computer instruction can be stored in a computer-readable storage medium, or transmitted from one computer-readable storage medium to another computer-readable storage medium. For example, the computer instruction can be transmitted from one website, computer, server, or data center to another website, computer, server, or data center in a wired manner or in a wireless manner. Examples of the wired manner can be a coaxial cable, an optical fiber, a digital subscriber line (DSL), etc. The wireless manner can be, for example, infrared, wireless, microwave, etc. The computer-readable storage medium can be any computer accessible usable-medium or a data storage device such as a server, a data center, or the like which is integrated with one or more usable media. The usable medium can be a magnetic medium (such as a soft disc, a hard disc, or a magnetic tape), an optical medium (such as a digital video disc (DVD)), or a semiconductor medium (such as a solid state disk (SSD)), etc.

It should be understood that, in various implementations of the disclosure, magnitudes of sequence numbers of various operations are not intended to indicate an execution order, and the execution order of the operations should be determined by their functions and internal logic and shall not constitute any limitation on an implementation process of implementations of the disclosure.

It will be evident to those skilled in the art that, for the sake of convenience and brevity, in terms of the specific working processes of the foregoing systems, apparatuses, and units, reference can be made to the corresponding processes in the foregoing method implementations, which will not be repeated herein.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method for channel estimation, comprising:

determining, by a terminal device, a first time-domain resource set used for repetitions of first data, based on first indication information received from a network device; and determining based on the first time-domain resource set, by the terminal device, a second time-domain resource set used for joint channel estimation;

wherein determining based on the first time-domain resource set, by the terminal device, the second time-domain resource set used for joint channel estimation comprises:

determining, by the terminal device, N nominal windows in a time-domain range corresponding to the first time-domain resource set according to a nominal window length, wherein N is an integer and N≥1; and obtaining in an $i^{th}$ nominal window of the N nominal windows, by the terminal device, the second time-domain resource set based on M time-domain resources which belong to the first time-domain resource set and have a preset relationship, wherein i is an integer and 1≤i≤N, and Mis an integer and M≥1.

2. The method of claim 1, further comprising:

transmitting, by the terminal device, the first data on the second time-domain resource set based on a signal configuration corresponding to joint channel estimation, wherein the signal configuration corresponding to joint channel estimation comprises at least one of: power consistency, antenna port consistency, precoding consistency, or phase continuity.

3. The method of claim 1, wherein the preset relationship comprises being consecutive in time domain.

4. The method of claim 1, further comprising:

determining, by the terminal device, that a first time-domain resource in the first time-domain resource set and a second time-domain resource in the first time-domain resource set have the preset relationship, when a time interval between the first time-domain resource and the second time-domain resource is less than or equal to a threshold interval, wherein the time-domain resource comprises a slot or a symbol.

5. The method of claim 1, wherein determining based on the first time-domain resource set, by the terminal device, the second time-domain resource set used for joint channel estimation comprises:

on condition that second indication information is received, determining based on the first time-domain resource set, by the terminal device, the second time-domain resource set used for joint channel estimation, wherein the second indication information indicates to perform joint channel estimation.

6. The method of claim 5, wherein the second indication information comprises at least one of: information for enabling joint channel estimation or first window-length indication information.

7. The method of claim 1, wherein the first indication information comprises at least one of: uplink (UL) grant information, configured grant indication information, or second window-length indication information.

8. A method for channel estimation, comprising:

sending, by a network device, first indication information to a terminal device, wherein the first indication information indicates that the terminal device is to determine a first time-domain resource set used for repetitions of first data, and the first time-domain resource set is used for determining a second time-domain resource set used for joint channel estimation;

determining, by the network device, the second time-domain resource set based on the first time-domain resource set;

wherein determining, by the network device, the second time-domain resource set based on the first time-domain resource set comprises:

determining, by the network device, N nominal windows in a time-domain range corresponding to the first time-domain resource set according to a nominal window length, wherein N is an integer and N≥1; and obtaining in an $i^{th}$ nominal window of the N nominal windows, by the network device, the second time-domain resource set based on M time-domain resources which belong to the first time-domain resource set and have a preset relationship, wherein i is an integer and 1≤i≤N, and Mis an integer and M≥1.

9. The method of claim 8, further comprising:

performing, by the network device, joint channel estimation for the first data on the second time-domain resource set.

10. The method of claim 8, wherein the preset relationship comprises being consecutive in time domain.

11. The method of claim 8, further comprising:

determining, by the network device, that a first time-domain resource in the first time-domain resource set and a second time-domain resource in the first time-domain resource set have the preset relationship, when a time interval between the first time-domain resource and the second time-domain resource is less than or equal to a threshold interval, wherein the time-domain resource comprises a slot or a symbol.

12. The method of claim 8, further comprising:

sending, by the network device, second indication information to the terminal device, wherein the second indication information indicates to perform joint channel estimation, wherein the second indication information comprises at least one of: information for enabling joint channel estimation or first window-length indication information.

13. A terminal device, comprising:

a memory configured to store computer programs; and a processor configured to invoke and execute the computer programs stored in the memory, to perform the following:

determine a first time-domain resource set used for repetitions of first data, based on first indication information received from a network device; and determine based on the first time-domain resource set, a second time-domain resource set used for joint channel estimation;

wherein the processor is configured to invoke and execute the computer programs stored in the memory, to further perform the following:

determine, by the terminal device, N nominal windows in a time-domain range corresponding to the first time-domain resource set according to a nominal window length, wherein N is an integer and N≥1; and obtaining in an $i^{th}$ nominal window of the N nominal windows, by the terminal device, the second time-domain resource set based on M time-domain resources which belong to the first time-domain resource set and have a preset relationship, wherein i is an integer and 1≤i≤N, and Mis an integer and M≥1.

14. The terminal device of claim 13, wherein the processor is configured to invoke and execute the computer programs stored in the memory, to further perform the following:

transmit the first data on the second time-domain resource set based on a signal configuration corresponding to joint channel estimation, wherein the signal configuration corresponding to joint channel estimation comprises at least one of: power consistency, antenna port consistency, precoding consistency, or phase continuity.

15. The terminal device of claim 13, wherein the preset relationship comprises being consecutive in time domain.

16. The terminal device of claim 13, wherein the processor is configured to invoke and execute the computer programs stored in the memory, to further perform the following:

determine that a first time-domain resource in the first time-domain resource set and a second time-domain resource in the first time-domain resource set have the preset relationship, when a time interval between the first time-domain resource and the second time-domain resource is less than or equal to a threshold interval, wherein the time-domain resource comprises a slot or a symbol.

17. The terminal device of claim 13, wherein the processor is configured to invoke and execute the computer programs stored in the memory, to further perform the following:

on condition that second indication information is received, determine based on the first time-domain resource set the second time-domain resource set used for joint channel estimation, wherein the second indication information indicates to perform joint channel estimation.

18. A network device, comprising:

a memory configured to store computer programs; and a processor configured to invoke and execute the computer programs stored in the memory, to perform the following:

send first indication information to a terminal device, wherein the first indication information indicates that the terminal device is to determine a first time-domain resource set used for repetitions of first data, and the first time-domain resource set is used for determining a second time-domain resource set used for joint channel estimation;

wherein the processor is configured to invoke and execute the computer programs stored in the memory, to further perform the following:

determining, by the network device, N nominal windows in a time-domain range corresponding to the first time-domain resource set according to a nominal window length, wherein N is an integer and N≥1; and obtaining in an $i^{th}$ nominal window of the N nominal windows, by the network device, the second time-domain resource set based on M time-domain resources which belong to the first time-domain resource set and have a preset relationship, wherein i is an integer and 1≤i≤N, and Mis an integer and M≥1.

19. The network device of claim 18, wherein the processor is configured to invoke and execute the computer programs stored in the memory, to further perform the following:

perform joint channel estimation for the first data on the second time-domain resource set.

20. The network device of claim 18, wherein the preset relationship comprises being consecutive in time domain.

* * * * *